W. Locke,
Cradle.
No. 88,724.  Patented April 6, 1869.
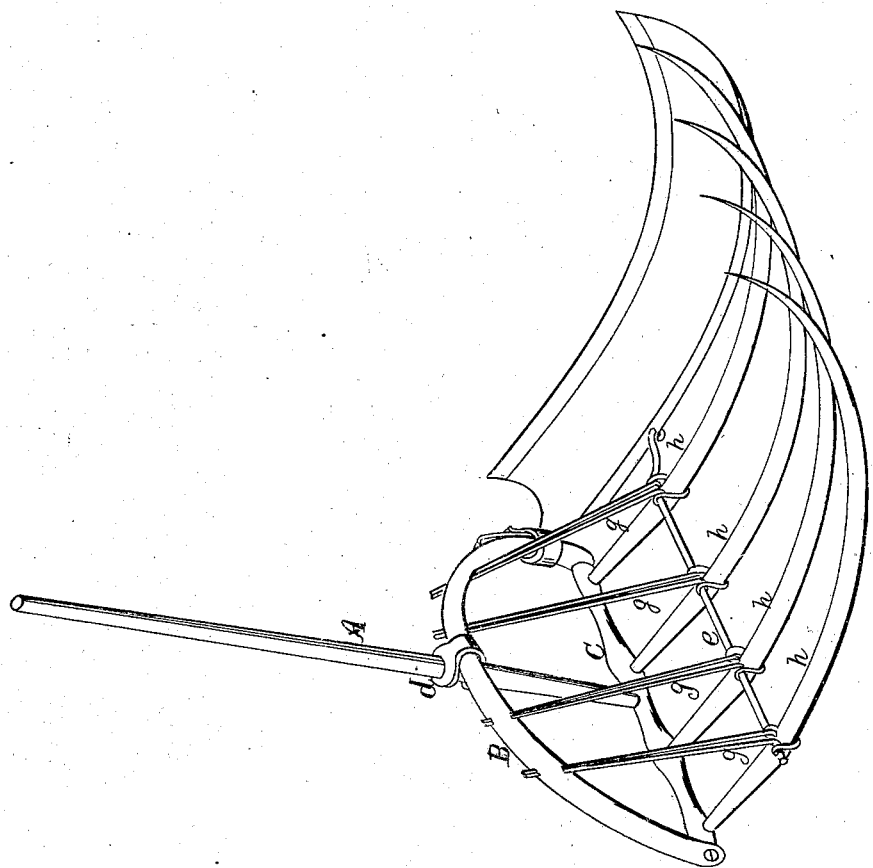
Witnesses
Jno. A. Ellis
Jas V White
Inventor
Wm Locke
pr F. H. Alexander Atty

WILLIAM H. LOCKE, OF CANTON, PENNSYLVANIA.

Letters Patent No. 88,724, dated April 6, 1869.

IMPROVEMENT IN GRAIN-CRADLES.

The Schedule referred to in these Letters Patent and making part of the same.

*To all whom it may concern:*

Be it known that I, WILLIAM H. LOCKE, of Canton, in the county of Bradford, and State of Pennsylvania, have invented certain new and useful Improvements in Grain-Cradles; and I do hereby declare that the following is a full, clear, and exact description thereof, reference being had to the accompanying drawings, and to the letters of reference marked thereon, which form a part of this specification, in which the figure in the annexed drawing represents a perspective view of my invention.

The nature of my invention consists in fastening the heel of a scythe to a semicircular bar, when said bar is constructed in the manner hereinafter described.

My invention further consists in the device for connecting the said semicircular bar with the snath, and also with the fingers of the cradle, in the manner fully set forth.

A represents a snath, to which the semicircular bar B is attached, by means of a metal plate, $d$, the said plate forming a loop around the bar at its middle. The ends of said loop extend outward, and are perforated, in order to receive the snath.

The lower end of the snath B is secured to tie C, the said tie serving to bind the two ends of bar B together.

$e$ represents a metal rod, which extends over the inner surface of the fingers $h$, at right angles with said fingers, and having a hook at one end, which passes through a hole in the rim of the scythe.

To the opposite end of $e$, a screw is cut, which is furnished with a nut, for raising and lowering the scythe.

$g\ g\ g\ g$ designate a series of small rods, which are intended to bind the rod $e$ and the fingers $h$ together, and also to confine both rod $e$ and fingers $h$ to bar B.

The rods $g\ g\ g\ g$ are inserted in their place in the following manner:

A single rod, of sufficient length, is passed through a hole in bar B, and then passed down to rod $e$, around which it is coiled once. It is then bent around a finger, $h$, until it reaches the rod $e$, around which it is again coiled, and, lastly, run through the same hole which it first entered, and there confined by a wedge. Between the loops thus formed, sheaths are employed to keep the fingers $h$ at their proper distance apart.

The heel of the scythe, it will be observed, is secured, in the ordinary way, to the bar B, in place of being fastened to the snath.

It will be seen that the position of the scythe can be changed by sliding the loop on plate $d$ on the snath, up or down, and the relative position of the fingers $h$ to the scythe, can be altered by drawing the rods $g\ g\ g\ g$ through bar B.

Having thus described my invention,

What I claim, and desire to secure by Letters Patent, is—

1. The semicircular bar B, employed substantially in the manner and for the purpose described.

2. The semicircular bar B, rods $g\ g\ g\ g$ and $e$, in combination with fingers $h\ h\ h\ h$, all arranged substantially as and for the purpose set forth.

In testimony that I claim the foregoing as my own, I affix my signature, in presence of two witnesses.

WM. H. LOCKE.

Witnesses:
WILLIAM IRVIN,
EDWIN NEWMAN.